(12) United States Patent
Greenwood

(10) Patent No.: US 8,911,023 B2
(45) Date of Patent: Dec. 16, 2014

(54) SOLDIER SUPPORT SYSTEM IN A VEHICLE

(75) Inventor: Kyle L. Greenwood, Bryan, TX (US)

(73) Assignee: Black Mountain Industries, Inc., Bryan, TX (US)

( * ) Notice: Subject to any disclaimer, the term of this patent is extended or adjusted under 35 U.S.C. 154(b) by 0 days.

(21) Appl. No.: 13/368,773

(22) Filed: Feb. 8, 2012

(65) Prior Publication Data

US 2012/0256469 A1    Oct. 11, 2012

Related U.S. Application Data

(63) Continuation of application No. 12/246,237, filed on Oct. 6, 2008, now Pat. No. 8,132,838.

(51) Int. Cl.
| | |
|---|---|
| *B60R 22/00* | (2006.01) |
| *B60R 22/12* | (2006.01) |
| *B60N 2/42* | (2006.01) |
| *F41H 7/04* | (2006.01) |
| *B60R 22/30* | (2006.01) |
| *B60R 22/14* | (2006.01) |

(52) U.S. Cl.
CPC ............... *B60R 22/30* (2013.01); *F41H 7/046* (2013.01); *B60R 22/14* (2013.01)
USPC .......................................... 297/483; 296/68.1

(58) Field of Classification Search
USPC ............ 296/68.1, 63, 65.03, 65.02; 297/483, 297/465, 468, 344.12, 344.18, 486
See application file for complete search history.

(56) References Cited

U.S. PATENT DOCUMENTS

| | | | |
|---|---|---|---|
| 228,518 A | 6/1880 | Dawes | |
| 298,625 A | 5/1884 | Saunders | |
| 1,242,024 A | 10/1917 | Nichols | |
| 1,518,600 A | 12/1924 | Nolen | |
| 2,442,375 A | 6/1948 | Paxton | |
| 2,527,905 A | 10/1950 | Barecki | |
| 2,556,076 A * | 6/1951 | Evans et al. ........................ | 5/9.1 |
| 2,829,702 A | 4/1958 | Keating | |
| 2,935,120 A | 5/1960 | Naus | |
| 3,184,205 A | 5/1965 | Leo | |
| 3,314,720 A | 4/1967 | Millington et al. | |
| 3,625,563 A | 12/1971 | Dickinson et al. | |

(Continued)

FOREIGN PATENT DOCUMENTS

WO    2006022880    3/2006

OTHER PUBLICATIONS

USPTO Office Action for U.S. Appl. No. 13/191,904 dated Oct. 18, 2011.

(Continued)

*Primary Examiner* — Glenn Dayoan
*Assistant Examiner* — Sunsurraye Westbrook
(74) *Attorney, Agent, or Firm* — Tumey L.L.P.

(57) ABSTRACT

A soldier restraint system and method secure a soldier in a vehicle. In one embodiment, the soldier restraint system is secured in a military vehicle. The soldier restraint system includes a seat assembly comprising a seat and straps. The soldier restraint system also includes a restraint harness belt. The restraint harness belt is secured to the seat assembly. In addition, the soldier restraint system includes mounting assemblies. The straps attach the seat to the mounting assemblies. The mounting assemblies are securable in the vehicle. Attachment of at least one of the straps to the seat is releasable by a release assembly.

20 Claims, 8 Drawing Sheets

(56) References Cited

U.S. PATENT DOCUMENTS

| | | | |
|---|---|---|---|
| 3,653,715 A | 4/1972 | Drabert et al. | |
| 3,659,844 A | 5/1972 | Cummins | |
| 3,868,143 A | 2/1975 | Reilly | |
| 3,954,041 A | 5/1976 | Mechulam et al. | |
| 4,099,778 A * | 7/1978 | Lehr | 297/472 |
| 4,119,044 A | 10/1978 | Hines | |
| 4,139,215 A | 2/1979 | Buitard et al. | |
| 4,474,347 A | 10/1984 | Mazelsky | |
| 4,602,816 A | 7/1986 | Chandler | |
| 4,738,413 A | 4/1988 | Spinosa et al. | |
| 4,822,224 A | 4/1989 | Carl et al. | |
| 4,836,480 A | 6/1989 | Besner | |
| 4,856,747 A | 8/1989 | Gano | |
| 4,923,147 A * | 5/1990 | Adams et al. | 244/122 AG |
| 4,927,211 A | 5/1990 | Bolcerek | |
| 5,010,850 A | 4/1991 | Sailer | |
| 5,015,010 A | 5/1991 | Homeier et al. | |
| 5,176,402 A * | 1/1993 | Coulon | 280/807 |
| 5,180,131 A | 1/1993 | Few | |
| 5,259,478 A | 11/1993 | Berish et al. | |
| 5,397,171 A | 3/1995 | Leach | |
| 5,533,934 A | 7/1996 | Miller | |
| 5,577,806 A | 11/1996 | Ugalde | |
| 5,642,916 A | 7/1997 | Dybro et al. | |
| 5,839,965 A | 11/1998 | Mullins | |
| 6,142,567 A | 11/2000 | Bentley | |
| D439,062 S | 3/2001 | McGinnis et al. | |
| 6,322,140 B1 | 11/2001 | Jessup et al. | |
| 6,409,243 B1 | 6/2002 | Hansen | |
| 6,467,576 B2 | 10/2002 | Figura et al. | |
| 6,481,777 B2 | 11/2002 | Mans | |
| 6,719,258 B2 | 4/2004 | Bryngelson et al. | |
| 6,725,855 B1 | 4/2004 | Brennan | |
| 6,913,314 B2 * | 7/2005 | Hansen | 297/216.1 |
| 7,100,991 B2 | 9/2006 | Schroth | |
| 7,175,233 B2 | 2/2007 | Greenwood et al. | |
| 7,269,963 B2 | 9/2007 | Yonekura et al. | |
| 7,293,818 B2 * | 11/2007 | Kumpf et al. | 296/68.1 |
| 7,413,247 B2 * | 8/2008 | Van Druff et al. | 297/216.17 |
| 7,758,095 B2 | 7/2010 | Elhanany | |
| 7,815,255 B1 * | 10/2010 | Kiel et al. | 297/216.1 |
| 8,011,730 B2 | 9/2011 | Greenwood | |
| 2004/0108165 A1 | 6/2004 | Poole et al. | |
| 2006/0207021 A1 | 9/2006 | Brunson et al. | |
| 2007/0096526 A1 | 5/2007 | Hentges | |
| 2010/0084897 A1 | 4/2010 | Greenwood | |
| 2010/0084907 A1 | 4/2010 | Greenwood et al. | |

OTHER PUBLICATIONS

USPTO Office Action for U.S. Appl. No. 12/245,861 dated Oct. 25, 2011.
USPTO Office Action for U.S. Appl. No. 12/245,861 dated Feb. 9, 2012.
European Search Report and Written Onion for EU Application No. EP 09819695 dated Apr. 2, 2013.
USPTO Office Action for U.S. Appl. No. 14/064,038 dated May 6, 2014.
USPTO Office Action for U.S. Appl. No. 13/631,976 dated Dec. 4, 2014.
Final Office Action for U.S. Appl. No. 13/631,976 dated May 7, 2014.
Notice of Allowance for U.S. Appl. No. 13/191,899 dated Jan. 30, 2014.
Notice of Allowance for U.S. Appl. No. 13/550,389 dated Jan. 24, 2014.
USPTO Office Action for U.S. Appl. No. 13/631,979 dated Apr. 17, 2014.

* cited by examiner

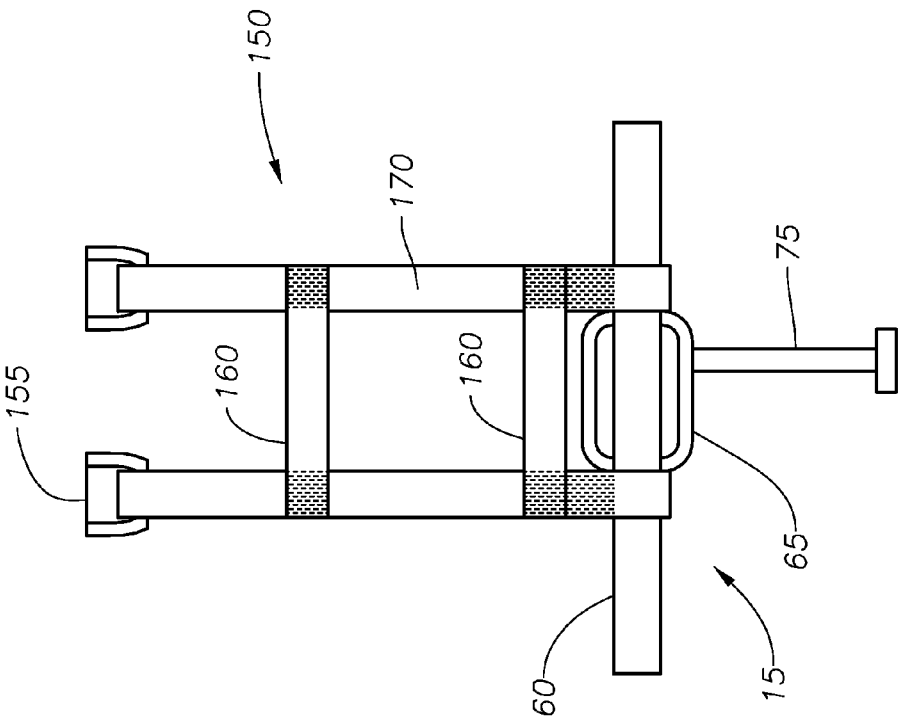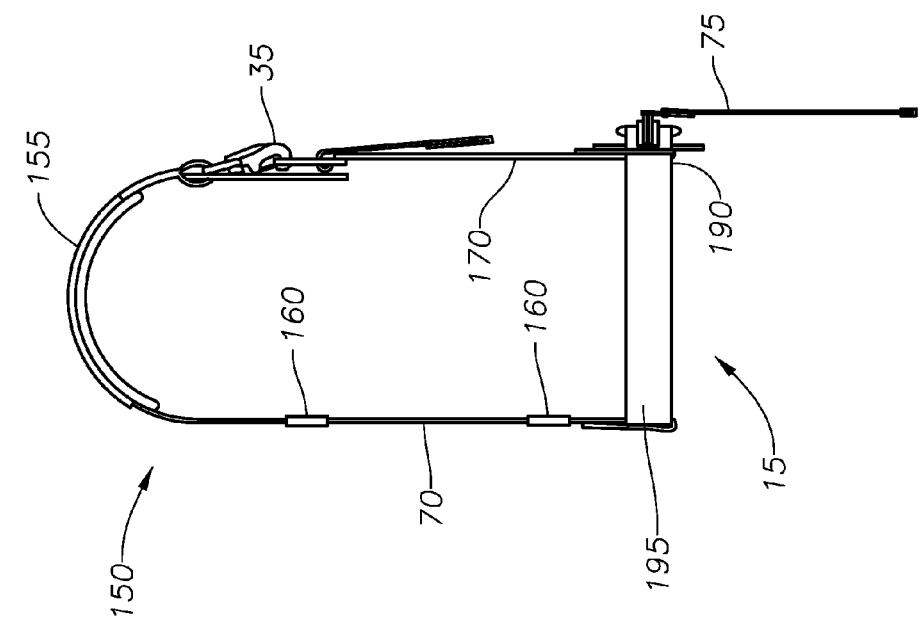

SOLDIER SUPPORT SYSTEM IN A VEHICLE

CROSS-REFERENCE TO RELATED APPLICATIONS

This application is a continuation of U.S. application Ser. No. 12/246,237 filed Oct. 6, 2008, which is herein incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of vehicle restraint systems and more specifically to soldier restraint systems in a vehicle.

2. Background of the Invention

Occupants of vehicles often need to be in an elevated position within the vehicle. For instance, in military vehicles, occupants of the military vehicles may need to expose the upper portion of the occupants' bodies outside of the vehicle. Such instances include the need to operate weaponry, improve vision outside of the military vehicle, and the like. Problems occur in such situations with fatigue involved with the individuals having to stand in such positions for long periods of time. Further problems include securing the occupant inside the vehicle during motion of the vehicle and also during a vehicle roll over to prevent injury of the occupant.

Consequently, there is a need for a restraint system to protect soldiers in a vehicle. Additional needs include an improved restraint system that secures an occupant in a vehicle and that also provides a seat to the occupant.

BRIEF SUMMARY OF SOME OF THE PREFERRED EMBODIMENTS

These and other needs in the art are addressed in one embodiment by a soldier restraint system secured in a vehicle such as a military vehicle. The soldier restraint system includes a seat assembly comprising a seat and straps. The soldier restraint system also includes a restraint harness belt. The restraint harness belt is secured to the seat assembly. In addition, the soldier restraint system includes mounting assemblies. The straps attach the seat to the mounting assemblies. The mounting assemblies are securable in the vehicle. The attachment of at least one of the straps to the seat is releasable by a release assembly.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 10 illustrates a side view of a restraint harness belt and a shoulder harness; and FIG. 11 illustrates a back view of a restraint harness belt and a shoulder harness.

DETAILED DESCRIPTION OF THE PREFERRED EMBODIMENTS

Figure 1:
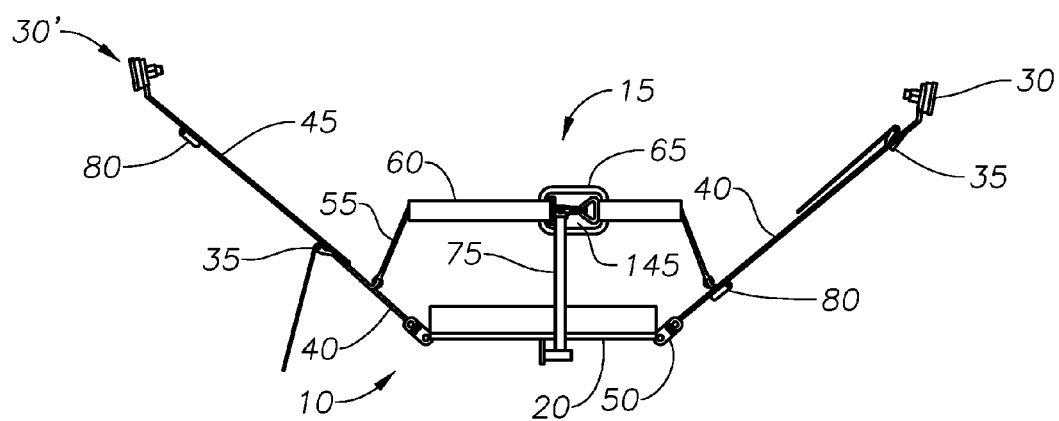
FIG. 1 illustrates a front view of a soldier restraint system having a seat assembly and a restraint harness belt.
Figure 2:
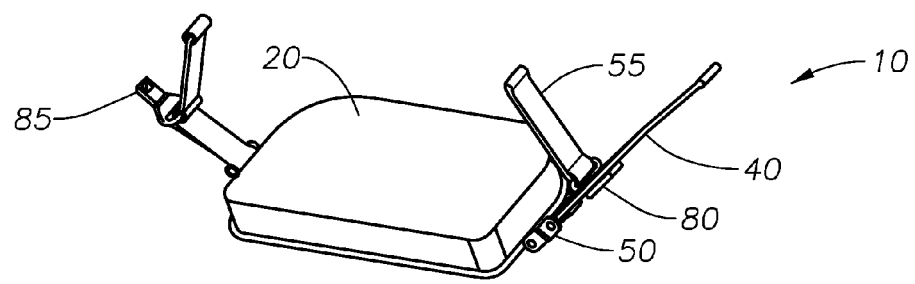
FIG. 2 illustrates a perspective view of a seat assembly.
Figure 3:
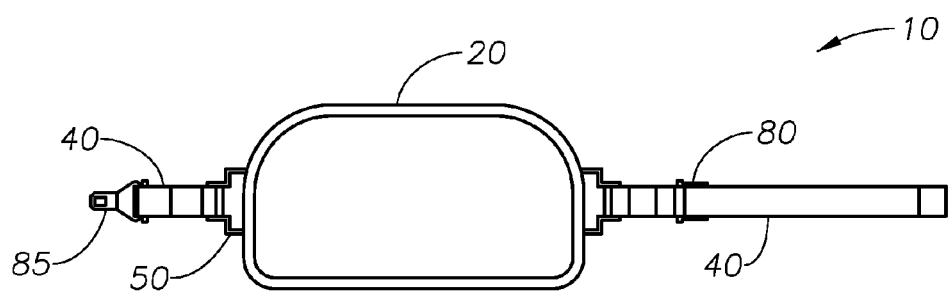
FIG. 3 illustrates a top view of a seat assembly.

FIG. 1 illustrates an embodiment of a soldier restraint system 5 that includes seat assembly 10 and restraint harness belt 15. Seat assembly 10 includes seat 20. Seat 20 may include any type of seat suitable for use in a vehicle. Seat 20 may also be composed of any material suitable for use in a vehicle. Without limitation, seat 20 may be composed of leather, plastic, nylon, and the like. In some embodiments, seat 20 includes a cushion. FIG. 2 illustrates a perspective view of an embodiment of seat 20. Seat 20 may have any configuration suitable for an individual (i.e., soldier) to sit upon. FIG. 3 illustrates a top view of an embodiment of seat 20. As illustrated, straps 40 are attached to seat 20. Straps 40 are attached to seat 20 by strap attachment means 50. Strap attachment means 50 include any means suitable for attaching straps 40 to seat 20. In embodiments as illustrated in FIGS. 1-3, strap attachment means 50 are brackets that allow straps 40 and seat 20 to swivel in relation to each other. Straps 40 may be composed of any material suitable for use in a vehicle such as nylon, leather, and the like. In some embodiments, straps 40 are suitably attached on opposing sides of seat 20 to provide balance to an individual sitting in seat 20. In embodiments as illustrated in FIGS. 1-3, two straps 40 are attached to seat 20. In alternative embodiments (not illustrated), more than two straps 40 are attached to seat 20. Mounting assemblies 30, 30' attach soldier restraint system 5 to the interior of the vehicle.

Figure 4:
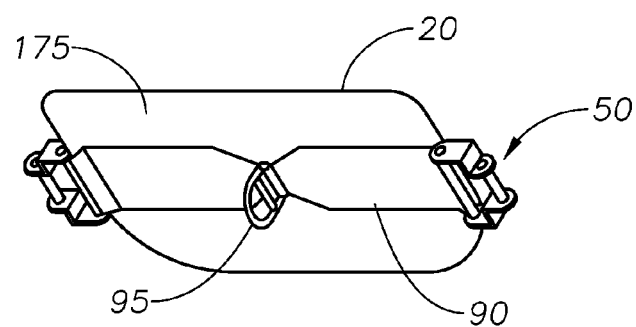
FIG. 4 illustrates a perspective bottom view of a seat assembly.

FIG. 4 illustrates a bottom perspective view of an embodiment of seat 20 in which seat 20 includes seat base strap 90. Seat base strap 90 includes base strap attachment means 95. Seat base strap 90 may be attached to bottom side 175 of seat 20 by any suitable means. In an embodiment as illustrated in FIG. 4, seat base strap 90 is attached to strap attachment means 50 and is disposed on bottom side 175. Base strap attachment means 95 includes any means suitable for securing seat 20 to another object such as the floor of the vehicle or a platform within the vehicle. In some embodiments, a strap (not illustrated) is secured to a platform in the vehicle and is attached to seat 20 at base strap attachment means 95. Sufficient tension is provided in the strap to prevent unwanted upward movement of seat 20 in the vehicle. For example, in an instance in which the vehicle rolls over, the tension in the strap attached to base strap attachment means 95 prevents seat 20 and an individual secured in seat 20 from harm by limiting the movement of seat 20. In an embodiment, seat base strap 90 has sufficient tension between the strap attachment means 50 to provide contact between seat base strap 90 and bottom side 175 and to not substantially lose the contact when secured to the strap.

In an embodiment as illustrated in FIG. 1, mounting assemblies 30, 30' are secured inside the vehicle. In some embodiments, mounting assemblies 30, 30' are secured to inside surfaces such as walls of the vehicle or a gun turret of the vehicle. FIG. 1 illustrates an embodiment of soldier restraint system 5 having mounting assemblies 30, 30' on opposing sides of seat 20. In embodiments as illustrated in FIG. 1, one mounting assembly 30 has an attached release assembly 35. The attached release assembly 35 is attached to a strap 40 that attaches mounting assembly 30 to seat 20. Strap 40 may be secured to seat 20 by any suitable means. In an embodiment as illustrated, strap 40 is secured to seat 20 by strap attachment means 50. Strap attachment means 50 includes any means suitable for attaching a strap to a seat. In an embodiment as shown, strap attachment means 50 is a bracket that swivels. Without limitation, a bracket that swivels allows limited motion of seat 20. In some embodiments, strap 40 includes adjusting means 80. Adjusting means 80 is any means suitable for adjusting the length of strap 40 between release assembly 35 and seat 20. The other mounting assembly 30' has an attached mounting strap 45 with a release assembly 35 attached on the opposing end of mounting strap 45 from mounting assembly 30'. In some embodiments, mounting strap 45 includes adjusting means 80. Seat 20 is attached to mounting assembly 30' by a strap 40 that attaches the release assembly 35 to seat 20. FIG. 1 illustrates an embodiment of soldier restraint system 5 that has two mounting assemblies 30, 30' but it is to be understood that soldier restraint system 5 is not limited to two mounting assemblies 30, 30' but in alternative embodiments (not illustrated) may have more than two mounting assemblies. Mounting assemblies 30, 30' are secured in the vehicle at a sufficient height to suspend seat 20 at a desirable height in the vehicle (i.e., from the floor or a platform in the vehicle). Adjusting means 80 allow the length of straps 40, 45 to be adjusted to adjust the suspension height of seat 20. Straps 40 attach seat 20 to release assemblies 35 by attachment means 85. Attachment means 85 may include any suitable means for attaching a strap to an object such as a hook, bracket, latch, and the like. Straps 40, 45 have a sufficient tension to facilitate suspension of seat 20 but in some embodiments also have a sufficient tension to allow the individual to have a desirable amount of movement while secured in seat 20. For instance, in an embodiment in which soldier restraint system 5 is secured in the vehicle to allow the individual to sit in a gun turret of the vehicle, the soldier may have a desire to move about in the interior when operating a weapon in a combat situation or to view outside the vehicle. Mounting assemblies 30, 30' may be secured in the vehicle at any degrees apart to provide a seat 20 of sufficient stability to allow an individual to sit in seat 20.

FIG. 1 illustrates an embodiment of soldier restraint system 5 in which one mounting assembly 30 has a release assembly 35 attached to the mounting assembly 30, and the other mounting assembly 30' has a release assembly 35 attached with a mounting strap 45 attached in between the mounting assembly 30' and the release assembly 35. Without limitation, the mounting assembly 30 has the release assembly 35 attached to provide a release assembly 35 at a sufficient proximity to the individual sitting in seat 20 to allow the individual to pull the release assembly 35 and quickly drop seat 20. Further, without limitation, the mounting assembly 30' has the release assembly at a lower position in relation to seat 20 to provide a release assembly 35 at a sufficient proximity to other individuals in the vehicle to pull the release assembly 35 and quickly drop seat 20. For instance, soldier restraint system 5 may be mounted in a gun turret of the vehicle wherein the soldier secured in soldier restraint system 5 has the upper portion of the soldier's body exposed outside of the vehicle. In a combat situation, the soldier secured in soldier restraint system 5 may desire to quickly drop down in the vehicle for protection by the vehicle. In such a situation, the release assembly 35 attached to mounting assembly 30 provides a convenient release assembly 35 by which the soldier may pull and release seat 20, thereby allowing the soldier to drop into the vehicle for protection. The soldier may also pull the release assembly 35 attached to the mounting assembly 30' with the mounting strap 45 in between, but, with seat 20 in an elevated position allowing the soldier to be positioned in the gun turret, the position of such release assembly 35 provides a convenient release for other soldiers in the vehicle to pull and release seat 20 to allow the soldier to drop into the vehicle for protection. For instance, the soldier may be injured and unable to pull a release strap 135, and such lower positioned release strap 135 allows the other soldiers to pull the release strap 135 and thereby allow the injured soldier to be quickly protected inside the vehicle. It is to be understood that soldier restraint system 5 is not limited to release assembly 35 attached to one mounting assembly 30 and another release assembly 35 disposed at a lower position in relation to seat 20. Soldier restraint system 5 may have release assemblies 35 disposed at any position in relation to seat 20. In an alternative embodiment (not illustrated), a mounting assembly 30 and/or 30' may have one release assembly 35 attached to the respective mounting assembly and at least one other release assembly 35 disposed between the one release assembly 35 and seat 20. In other alternative embodiments (not illustrated), both mounting assemblies 30, 30' have a release assembly 35 attached to the respective mounting assembly 30, 30'. In some alternative embodiments (not illustrated), both mounting assemblies 30, 30' have an attached release assembly 35 with a mounting strap 45 disposed between the respective mounting assembly and the release assembly 35. It is to be understood that when one release assembly 35 is pulled to release seat 20 from the respective mounting assembly 30 or 30', seat 20 remains secured to the other mounting assembly 30 or 30', which protects the individual secured in soldier restraint system 5 in the event of a roll over or injury from other motion of the vehicle.

Figure 5:
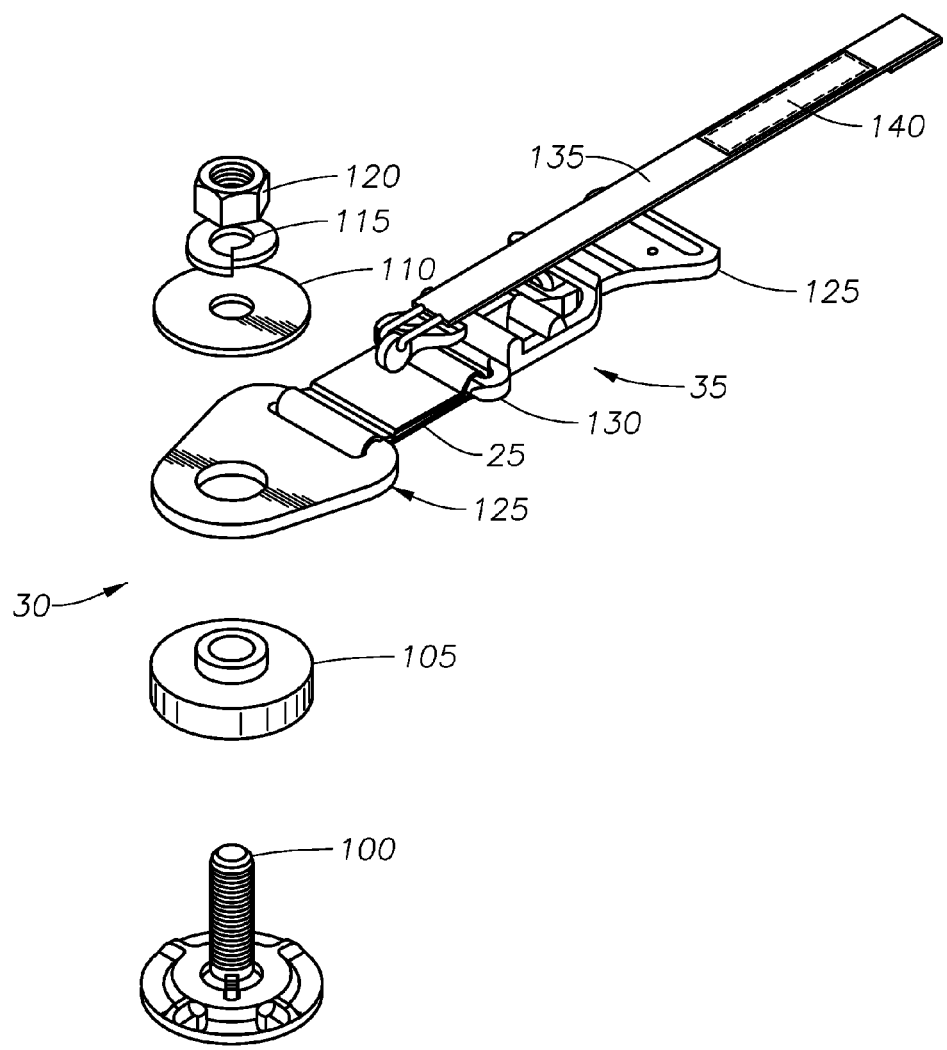
FIG. 5 illustrates a mounting assembly and a release assembly.

FIG. 5 illustrates an embodiment of a mounting assembly 30 with release assembly 35 attached. For illustration purposes only, mounting assembly 30 is shown in an exploded view. Mounting assembly 30 may include any suitable method for securing a strap to a wall. For instance, mounting assembly 30 may include nails, hooks, screws, adhesives, studs, magnets, and the like. In an embodiment as illustrated, mounting assembly 30 includes a bond stud 100, which secures bracket 125 of release assembly 35 within the vehicle. In an embodiment in which bond stud 100 secures bracket 125 to a steel surface inside the vehicle, the surface of the steel may be prepared and then bond stud 100 may be allowed to cure on the steel. In some embodiments, a bushing 105 slides over bond stud 100. Other embodiments also include mounting assembly 30 including other securing means such as washer 110, lock washer 115, and nut 120. Without limitation, with mounting assembly 30 including bond stud 100, the vehicle surface does not need to be welded or drilled to secure seat 20, which provides a reinforced substrate strength and facilitates corrosion resistance. Further, without limitation, welding or drilling on minor plate steel may compromise the integrity of the armor system.

As shown in FIG. 5, release assembly 35 includes latch and base release 130 and release strap 135. In the embodiment as shown, mounting assembly 30 secures release assembly by securing bracket 125 to the vehicle, with the bracket 125 attached to latch and base release 130 by tether 25. Release assembly 35 has another bracket 125 on the opposing end of release assembly 35 to secure release assembly 35 to strap 40 (not illustrated). A sufficient pulling force applied to release strap 135 releases latch and base release 130, releasing strap 40 from mounting assembly 30. Without limitation, release assembly 35 provides a quick release mechanism. Strap may be re-attached to mounting assembly 30 by re-connecting latch and base release 130 together. In an embodiment, release strap 135 has a reflector 140. Reflector 140 includes any reflective material that is suitable for attachment to a strap 40 and for use in a military vehicle. Without limitation, reflector 140 improves the visibility of release strap 135. It is to be understood that release assembly 35 is not limited to the embodiment illustrated in FIG. 5 but may include any other mechanisms suitable for allowing such a quick release. In an embodiment, release assembly 35 is a quick release mechanism of the type referred to as an ejector hook for use in the parachute industry.

Figure 6:
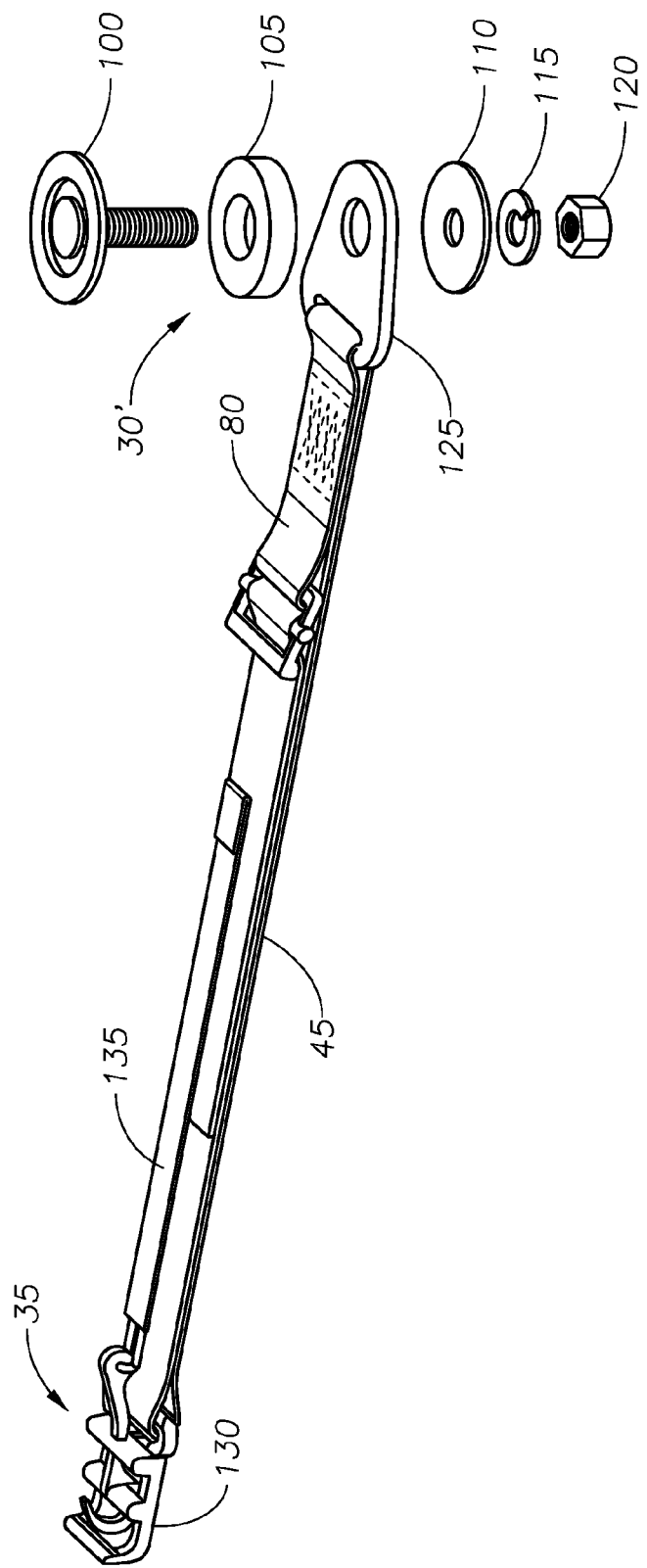
FIG. 6 illustrates a mounting assembly, mounting strap, and a release assembly.

FIG. 6 illustrates an embodiment in which mounting assembly 30' is attached to mounting strap 45 with release assembly 35 attached to mounting strap 45 on the opposing end from mounting assembly 30'. For illustration purposes only, mounting assembly 30 is shown in an exploded view. In an embodiment as shown, mounting strap 45 has a length that is adjustable by adjusting means 80. Bond stud 100 passes through bracket 125 to secure mounting strap 45, with the opposing end of mounting strap 45 secured to release assembly 35. As shown in FIG. 1, strap 40 is secured to the opposing end of release assembly 35 from mounting strap 45.

Figure 7:
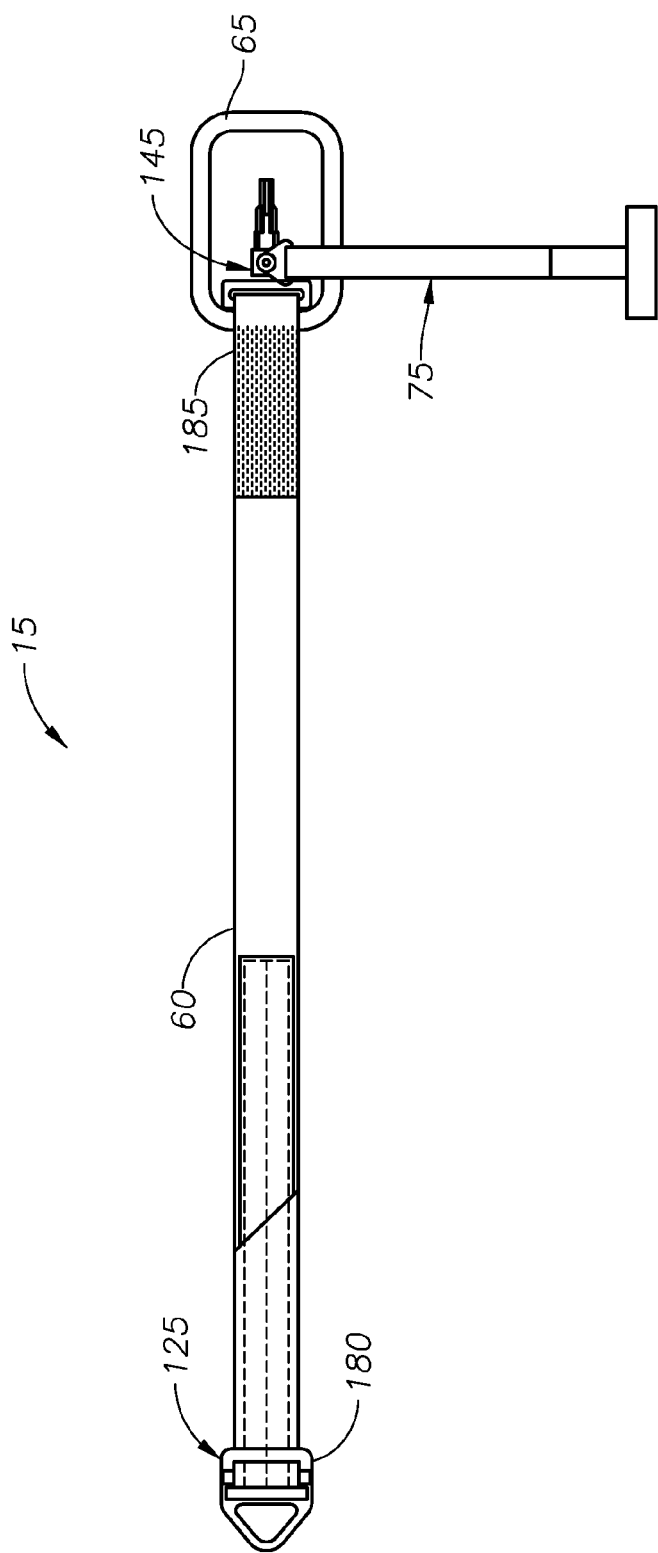
FIG. 7 illustrates a front view of a restraint harness belt.

FIG. 7 illustrates an embodiment of restraint harness belt 15 in which restraint harness belt 15 has belt strap 60 and bracket 125. Belt strap 60 has bracket 125 secured to one end and belt release 145 secured to the opposing end of belt strap 60. Belt release 145 is any mechanism suitable for receiving bracket 125 and securing ends 180 and 185 together. It is to be understood that restraint harness belt 15 is not limited to bracket 125 and belt release 145 but may include any other suitable means for attaching ends 180 and 185 together. In an embodiment as shown, belt strap 60 has an adjustable length, which allows belt strap 60 to be adjusted to the waist of the individual to suitably secure the individual in soldier restraint system 5. In an embodiment as illustrated in FIG. 7, pull strap 75 is attached to the release mechanism of belt release 145. A suitable pulling force applied to belt strap 75 activates the release mechanism and releases bracket 125 from belt release 145. Without limitation, belt strap 75 provides a quick release of restraint harness belt 15 and allows the individual to exit restraint harness belt 15 quickly. In an embodiment as illustrated in FIG. 7, restraint harness belt 15 has belt pad 65. Belt pad 65 may have any configuration and size suitable for providing a cushion between the individual and bracket 125 and belt release 145 when secured to each other.

FIGS. 1 and 2 illustrate an embodiment of soldier restraint system 5 in which restraint harness belt 15 is attached to seat assembly 10 by tethers 55. The tethers 55 may be secured to any suitable part of seat assembly 10. In an embodiment, tethers 55 are secured to straps 40 and/or seat 20. Tethers 55 are also secured to belt strap 60. Tethers 55 may be secured to belt strap 60 at any suitable location. In an embodiment, tethers 55 are slidably attached to belt strap 60, which allows the location of tethers 55 to be adjusted. Without limitation, adjusting the location of tethers 55 on belt strap 60 allows their location to be adjusted to take into account an adjustment in the length of belt strap 60. Tethers 55 may be secured to seat assembly 10 by any suitable means. In an embodiment, tethers 55, straps 40, and mounting strap 45 have sufficient tension to maintain the desired suspension of seat 20 to secure the individual within soldier restraint system 5 but also to allow the individual a desired amount of ability to conduct desired tasks (i.e., operate a weapon in the gun turret, lean over, turn body to view outside vehicle, and the like).

Figure 8:
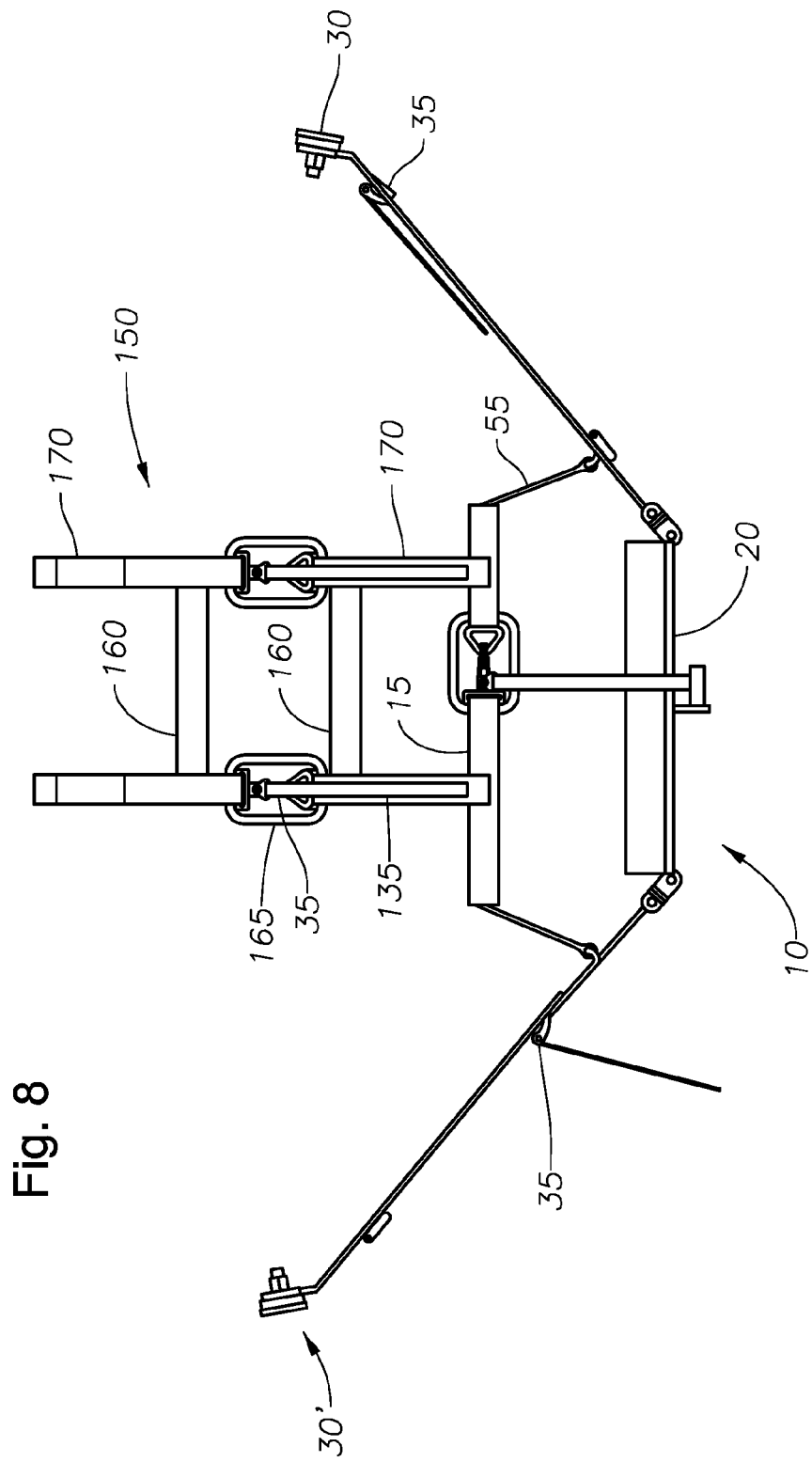
FIG. 8 illustrates a front view of a soldier restraint system having a seat assembly, a restraint harness belt, and a shoulder harness.
Figure 9:
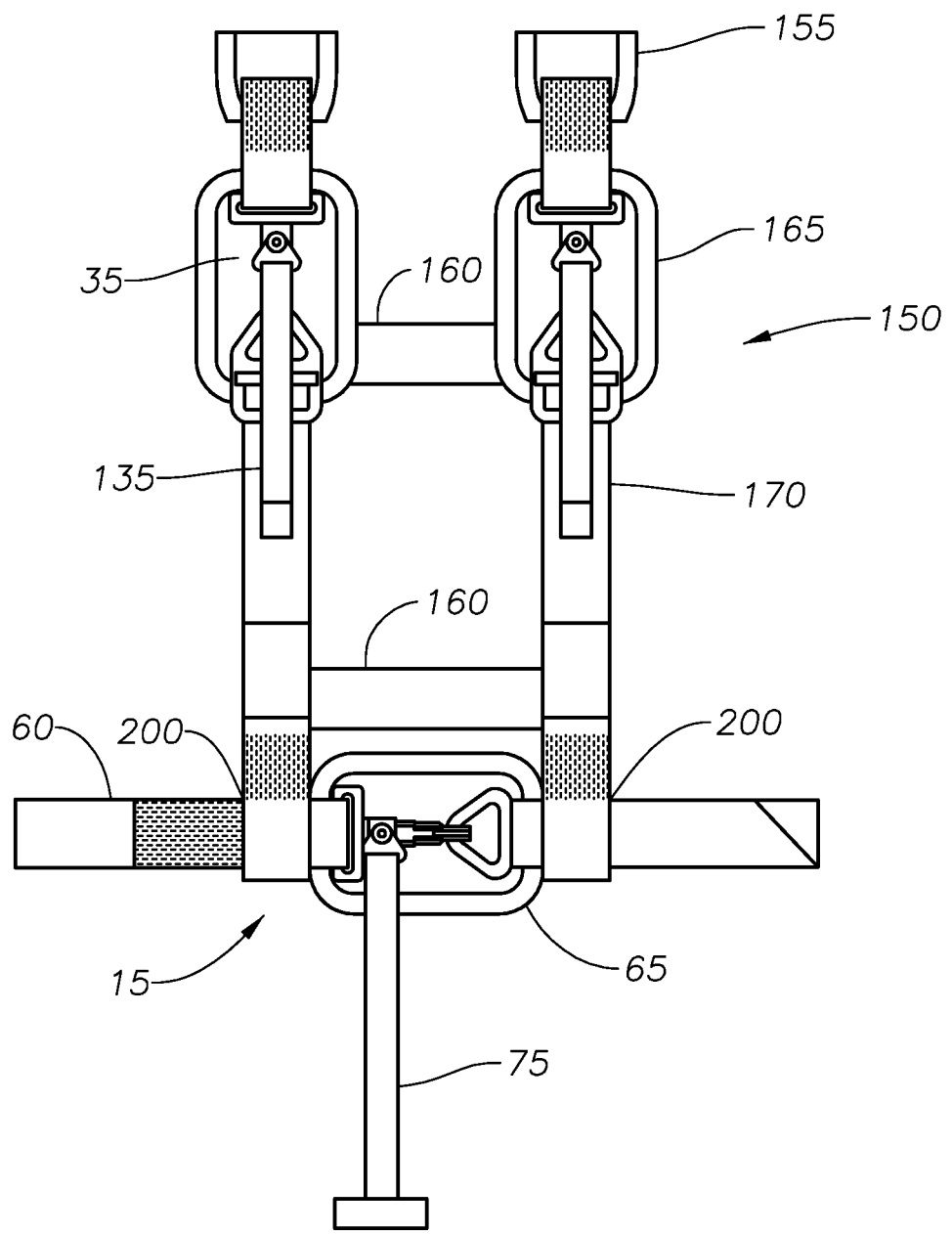
FIG. 9 illustrates a front view of a restraint harness belt and a shoulder harness.

FIG. 8 illustrates an embodiment of soldier restraint system 5 in which shoulder harness 150 is attached to restraint harness belt 15. FIG. 9 illustrates a front view of shoulder harness 150 attached to restraint harness belt 15. Shoulder harness 150 includes shoulder harness straps 170. FIG. 10 illustrates a side view of an embodiment of soldier restraint system 5 having shoulder harness 150. In an embodiment as illustrated, shoulder harness 150 has two shoulder harness straps 170 that are each attached to the front side 190 and back side 195 of restraint harness belt 15. Each shoulder harness strap 170 passes over the shoulder of the individual. Shoulder harness straps 170 have a tension sufficient to secure the individual within soldier restraint system 5 but that also allows the individual to conduct desired tasks. In some embodiments, the width between shoulder harness straps 170 is adjustable. Without limitation, adjusting the width between shoulder harness straps 170 allows the shoulder width of different individuals to be taken into account. The width may be adjusted by any suitable means. In embodiments as illustrated, belt strap 60 passes through loops 200 in each shoulder harness strap 170 to allow adjustment of the width. It is to be understood that shoulder harness 150 is not limited to two shoulder harness traps 170 but in alternative embodiments (not illustrated) may also include more than two shoulder harness straps 170. In embodiments as illustrated, shoulder harness straps 170 each have a release assembly 35. In an embodiment, the release assemblies 35 have release straps 135. In some embodiments, the release assemblies 35 are located in the front of shoulder harness straps 170. Without limitation, locating the release assemblies 35 in the front of shoulder harness straps 170 allows the individual to release the shoulder harness 150, with the release straps 135 allowing a quick release. In alternative embodiments (not illustrated), only one of the shoulder harness straps 170 has a release assembly 35. In some embodiments as illustrated, shoulder harness straps 170 have buckle pads 165, which are disposed between the individual and release assembly 35. Buckle pads 165 may have any configuration and size suitable for providing a cushion between the individual and release assembly 35 when secured to each other. In some embodiments, shoulder harness 150 also includes back supports 160. FIG. 11 illustrates a back view of shoulder harness 150 and restraint harness belt 15 showing back supports 160. Shoulder harness 150 may have any desirable number of back supports 160. In embodiments as illustrated, shoulder harness 150 has a back support 160 in an upper region of shoulder harness 150 and a back support 160 in a lower region of shoulder harness 150. Without limitation, such locations of back supports 160 provide support for the upper and lower back of the individual. Back supports 160 may be composed of any suitable material. In some embodiments as illustrated, shoulder harness straps 170 also have shoulder pads 155. Without limitation, shoulder pads 155 provide a cushion to the shoulders of the individual.

The vehicle in which soldier restraint system 5 is secured may include any vehicle such as a truck, car, military vehicle, helicopter, air plane, and the like. In an embodiment, the vehicle is a military vehicle.

It is to be understood that soldier restraint system 5 is not limited to soldiers but may be used for any type of individual.

Although the present invention and its advantages have been described in detail, it should be understood that various changes, substitutions and alterations may be made herein without departing from the spirit and scope of the invention as defined by the appended claims.

What is claimed is:

1. A soldier restraint system in a vehicle, comprising:
 a mobile seat assembly, wherein the seat assembly further comprises a seat base strap and a seat, and wherein the seat base strap comprises a base strap attachment means, and further wherein the seat assembly comprises strap attachment means disposed on opposing sides of the seat;
 a restraint harness belt, wherein the restraint harness belt is attached to the seat assembly;
 a mounting assembly, wherein the seat assembly is attached to the mounting assembly, and wherein the mounting assembly is securable in the vehicle, and further wherein the seat assembly comprises a quick release assembly; and
 a shoulder harness.

2. The soldier restraint system of claim 1, wherein the restraint harness belt comprises a belt pad.

3. The soldier restraint system of claim 2, wherein the vehicle comprises a platform, and wherein the seat assembly is attached to the platform.

4. The soldier restraint system of claim 1, wherein the restraint harness belt comprises a belt strap.

5. The soldier restraint system of claim 4, wherein the belt strap has an adjustable length.

6. The soldier restraint system of claim 1, wherein a tether secures the restraint harness belt to the seat assembly.

7. The soldier restraint system of claim 1, wherein the shoulder harness is attached to the restraint harness belt.

8. The soldier restraint system of claim 7, wherein the shoulder harness comprises a shoulder harness strap.

9. The soldier restraint system of claim 8, wherein the shoulder harness comprises two shoulder harness straps.

10. The soldier restraint system of claim 9, wherein the shoulder harness comprises a width between the two shoulder harness straps, and wherein the width is adjustable.

11. The soldier restraint system of claim 10, wherein each of the shoulder harness straps comprises a loop.

12. The soldier restraint system of claim 11, wherein the restraint harness belt comprises a belt strap, and wherein the belt strap passes through the loops.

13. The soldier restraint system of claim 8, wherein the shoulder harness strap is attached to a front side and to a back side of the restraint harness belt.

14. The soldier restraint system of claim 8, wherein the shoulder harness strap comprises a release assembly.

15. The soldier restraint system of claim 14, wherein the shoulder harness strap comprises a front, and wherein the release assembly is disposed on the front.

16. The soldier restraint system of claim 14, wherein the quick release assembly comprises a latch and base release and a release strap.

17. The soldier restraint system of claim 8, wherein the shoulder harness strap comprises a shoulder pad.

18. The soldier restraint system of claim 1, further comprising a buckle pad.

19. The soldier restraint system of claim 1, wherein the shoulder harness comprises a back support.

20. The soldier restraint system of claim 19, wherein the shoulder harness comprises two back supports, and wherein one of the back supports is disposed in an upper region of the shoulder harness and the other back support is disposed in a lower region of the shoulder harness.

* * * * *